United States Patent
Latschbacher (10) Patent No.: US 10,785,923 B2
(45) Date of Patent: Sep. 29, 2020

(54) CLAMP ARRANGEMENT, SETTING TOOL SYSTEM AND USE OF A SETTING TOOL SYSTEM

(71) Applicant: Latschbacher GmbH, Kronstorf (AT)

(72) Inventor: Klaus Latschbacher, Kronstorf (AT)

(73) Assignee: LATSCHBACHER GMBH, Kronstorf (AT)

( * ) Notice: Subject to any disclaimer, the term of this patent is extended or adjusted under 35 U.S.C. 154(b) by 139 days.

(21) Appl. No.: 15/683,383

(22) Filed: Aug. 22, 2017

(65) Prior Publication Data

US 2018/0054979 A1 Mar. 1, 2018

(30) Foreign Application Priority Data

Aug. 24, 2016 (EP) .................................... 16185491

(51) Int. Cl.
*A01G 13/00* (2006.01)
*F16B 15/00* (2006.01)
*A01G 23/00* (2006.01)

(52) U.S. Cl.
CPC ............. *A01G 13/00* (2013.01); *A01G 23/00* (2013.01); *F16B 15/0015* (2013.01)

(58) Field of Classification Search
CPC .... A01G 13/00; A01G 13/0237; A01G 23/00; A01G 7/06; A01G 17/00; A01G 17/005; A01G 17/04; A01G 17/12; Y10T 24/44017; F16B 15/0015
USPC ...................................... 47/32.4, 32.5, 8, 42
See application file for complete search history.

(56) References Cited

U.S. PATENT DOCUMENTS

| 1,758,822 | A | | 5/1930 | Birdsong |
| 4,213,374 | A | * | 7/1980 | Husler ................ F16B 15/0007 411/459 |
| 5,240,126 | A | * | 8/1993 | Foster .................... A47F 1/126 211/175 |
| 5,244,328 | A | | 9/1993 | Higgins |
| 6,077,179 | A | * | 6/2000 | Liechty, II ................ F42B 6/08 473/582 |
| 6,141,903 | A | * | 11/2000 | Mancini ................. A01G 17/04 248/351 |
| 6,286,570 | B1 | * | 9/2001 | Murray ..................... E01B 3/06 144/329 |
| 6,679,669 | B2 | * | 1/2004 | Masa ...................... F16B 15/06 411/451.1 |
| 2004/0187425 | A1 | | 9/2004 | Kozyrski |
| 2005/0274229 | A1 | * | 12/2005 | Latschbacher ....... A01G 23/099 81/23 |

(Continued)

FOREIGN PATENT DOCUMENTS

| DE | 2756419 | 7/1978 |
| EP | 0248928 | 12/1987 |
| EP | 1317632 | 1/2006 |

(Continued)

*Primary Examiner* — Tien Q Dinh
*Assistant Examiner* — Brady W Frazier
(74) *Attorney, Agent, or Firm* — Hoffmann & Baron, LLP (57) ABSTRACT

A clamp arrangement for tree trunks with a main body on which at least three retaining tongues are formed, arranged at a distance from one another, wherein the main body and the retaining tongues are oriented, as blades, in a common cutting direction, and wherein at least two snap lugs are formed on the main body and/or on at least one retaining tongue to allow a detachable connection with a setting tool.

13 Claims, 4 Drawing Sheets

(56) References Cited

U.S. PATENT DOCUMENTS

2006/0010678 A1* 1/2006 Parent ................. B25C 11/00
29/525.01

FOREIGN PATENT DOCUMENTS

| FR | 2638555 | 5/1990 |
|----|---------|--------|
| FR | 2879118 | 6/2006 |
| WO | WO9114057 | 9/1991 |

* cited by examiner

CLAMP ARRANGEMENT, SETTING TOOL SYSTEM AND USE OF A SETTING TOOL SYSTEM

BACKGROUND OF THE INVENTION

The invention relates to a clamp arrangement for tree trunks, a setting tool for manipulating clamp arrangements, a setting tool system which comprises a setting tool, a clamp arrangement and a clamp magazine as well as the use of such a setting tool system in order to secure a cut surface of a tree trunk.

Known from EP 1 317 632 B1 is a system for minimising end splinters in a tree trunk which comprises an anti-splitting device with a central web section and a pair of end web sections which are connected near their mid-points with opposite ends of the central web section in order to provide the anti-splitting device with a substantially L-formed top-view configuration. The web sections have first and second edges facing in opposite directions, wherein the first side edges narrow so as to define a cutting edge in order to facilitate insertion of the anti-splitting device into the tree trunk, wherein the second side edges are substantially plane-parallel and parallel to the cutting edge, so as to define a driving surface onto which a force can be applied to the anti-splitting device in order to drive the cutting edge into the tree trunk, and at least two projections which project from the driving surface, as well as a driving instrument for driving the anti-splitting device into a tree trunk having a driving surface with a circular groove with an outer diameter and an inner diameter, wherein the circular groove receives the at least two projections, which are dimensioned and arranged to allow slidable frictional contact with either the outer diameter or the inner diameter, and wherein the circular groove makes it possible for the anti-splitting device to be rotated while it is in frictional contact with the driving surface in order to achieve the desired position of the anti-splitting device in relation to the tree trunk.

SUMMARY OF THE INVENTION

The object of the invention is to provide a clamp arrangement, a setting tool, a setting tool system as well as a use of a setting tool system which make possible simplified operation.

This object is achieved through a clamp arrangement with the following features: clamp arrangement for tree trunks, which comprises a main body on which at least three retaining tongues are arranged, spaced apart from one another, wherein the main body and the retaining tongues are oriented, as blades, in a common cutting direction and wherein at least two snap lugs are formed on the main body and/or on at least one retaining tongue to allow a detachable connection with a setting tool.

In the clamp arrangement according to the invention, in departure from the prior art, in which only two retaining tongues arranged at a distance from one another are provided, the provision of at least three retaining tongues arranged at a distance from one another makes it possible to achieve an advantageous orientation of the clamp arrangement while carrying out the operation of driving it into the cut surface of the tree trunk. The retaining tongues preferably project from the main body on both sides. It is particularly advantageous if the third retaining tongue, which is arranged between the two other retaining tongues, ensures an additional stabilization of the orientation of the main body in relation to the cut surface of the tree trunk. In particular, this for the most part, in particular completely, prevents an undesired torsion of the main body which, like the retaining tongues, is exposed to the cutting forces introduced by the setting tool. In particular, this prevents the situation that, during the driving operation, the main body is, at least in parts, deformed to the point that it is no longer aligned in a common cutting direction with the retaining tongues. This results in an increase in the torsion effect which in consequence leads to a defective driving of the clamp arrangement into the cut surface of the tree trunk. In contrast, if distributed appropriately along the extension of the main body, the at least three retaining tongues arranged at a distance from one another guarantee that the main body is reliably supported during the driving operation and no undesired deformation occurs which would impede a desired, in particular complete driving of the clamp arrangement into the cut surface of the tree trunk. The at least two snap lugs of the clamp arrangement can, optionally, be provided exclusively on the retaining tongues or exclusively on the main body. Alternatively, it can also be the case that one of the two snap lugs is provided on the main body, while the other snap lug is provided on one of the retaining tongues. Particularly preferably, the clamp arrangement is designed as an injection-moulded plastic part and/or the main body and the retaining tongues attached thereto are formed as a single piece.

Advantageous further developments of the invention are the subject matter of the dependent claims.

It is expedient if the retaining tongues project from a largest surface of the main body. This guarantees the desired supporting effect for the main body, which is preferably in the form of a slim blade, since cutting forces introduced into the clamp arrangement can be transmitted via the retaining tongues into the cut surface of the tree trunk and do not lead to the undesired deformation of the main body. If the largest surface is designed as a plane, a surface normal to this plane is oriented at right angles to the cutting direction and the retaining tongue preferably extends along the surface normals. If the largest surface is designed as a surface which is, at least in parts, curved and/or stepped, the surface normals of at least the overwhelming majority of surface sections which determine the largest surface of the main body are oriented at right angles or at least virtually at right angles to the cutting direction, and the retaining tongue preferably extends along the surface normal which is determined by the surface on which the retaining tongue is arranged.

It is advantageous if the main body and/or the retaining tongue have a prismatic carrier section and a blade section adjoining the carrier section. The carrier section and the blade section are formed together in a single piece and form a blade through which both the main body and also the retaining tongue can be described geometrically. The carrier section of this blade has constant cross-sections along an extension path, in particular along a straight extension, in cross-sectional planes which are oriented perpendicular to the extension path. Preferably, a profile or cross-section for the main body and/or the retaining tongue has two longest edges which are oriented at least substantially parallel to one another, so that the main body and/or the retaining tongue in each case form a wedge-formed or plane-parallel plate-formed blade, on the lower narrow side of which the blade section is formed. The blade section can, like the carrier section, have a prismatic geometry, but can however also be of different form, in particular in order to make possible an advantageously easy penetration into the end face of the tree trunk during the driving operation.

Preferably, the carrier section of the main body and/or the retaining tongue has a narrow, in particular flat side opposite the blade section which is designed for the transmission of cutting forces into the main body and/or the retaining tongue. This narrow side, which can also be described as the blade back, comes into contact with a corresponding surface of the setting tool from which the cutting forces are transferred to the clamp arrangement. In order to guarantee as even as possible a flow of force from the setting tool into the clamp arrangement, it is preferable if the narrow side is flat and the setting tool has a corresponding flat contact surface. Particularly preferably, a surface normal on the narrow side is oriented parallel to the cutting direction, which is determined by the main body and the retaining tongues.

In an advantageous further development of the invention, the blade section has a wave-formed cutting edge and/or a wave-formed profile. This measure is intended, on the one hand, to facilitate a penetration of the blade section into the cut surface of the tree trunk during the carrying out of the driving operation. This applies in particular to the wave-formed cutting edge, through which at the beginning of the driving operation the blade section initially only lies against the cut surface of the tree trunk at certain points, where it already begins to cut into the cut surface, while adjacent regions of the blade section only come into contact with the cut surface of the tree trunk once a certain penetration of the clamp arrangement has begun. The wave-formed profile of the blade section serves to prevent the formation of cracks in the cut surface of the tree trunk into which the clamp arrangement is driven.

In further embodiment of the invention, the snap lug has an L-formed profile, wherein a first L-arm is oriented parallel to a narrow side of the main body and/or the retaining tongue and wherein a second L-arm is provided with a projecting snap-locking geometry, in particular with a wedge-formed profile. The snap lugs, which can be arranged either on the main body or on the retaining tongue, in each case on a narrow side, serve to fix the clamp arrangement to a setting tool. The snap-locking geometry of the snap lug is hereby designed to engage in an undercut formed in the setting tool. The snap-locking geometry also makes possible a tool-free fixing of the clamp arrangement on the setting tool as well as an also tool-free detachment of the setting tool from the clamp arrangement after it has been driven into the cut surface of the tree trunk.

In a further embodiment of the invention, a retaining tongue attached at the end of the main body forms a T-formed profile with the main body and/or a retaining tongue attached to the main body between further retaining tongues forms a T-formed or cross-formed profile. In judging the profile of the retaining tongues, in each case the retaining tongue as such and an adjacent region of the main body, but not the entire main body, is considered. The T-formed profile of the retaining tongue attached at the end of the main body makes possible an advantageous transmission of force from the clamp arrangement into the cut surface of the tree trunk. This means that forces occurring in the region of the crack in the cut surface of the tree trunk which is to be bridged, which could lead to a propagation of the crack formation, can, in a particularly advantageous manner, be dissipated through the retaining tongues positioned at the ends into surrounding regions of the cut surface of the tree trunk, without an additional risk of crack formation existing here. The T-formed or cross-formed profile of the at least one further retaining tongue, which is arranged between the retaining tongues attached at the ends of the main body, serves in particular to support the main body during the driving operation in order to avoid an undesired deformation of the main body and thus a defective driving result for the clamp arrangement.

It is expedient if the snap lugs are formed, in particular in pairs, on retaining tongues attached at opposite ends of the main body, arranged at a maximum distance from one another. On the one hand, this arrangement makes possible a simple design of the setting tool, and on the other hand this guarantees a reliable support of the entire clamp arrangement on the setting tool, which is in particular of great importance in the phase in which the clamp arrangement is being driven into the cut surface of the tree trunk.

It is advantageous if the carrier section is designed, at least in sections, with an at least substantially rectangular cross-section, in particular with a rectangular cross-section, and if the blade section extends along a longest edge of the carrier section. With a rectangular design of the carrier section, an advantageous compromise is achieved between the behaviour of the clamp arrangement during the driving operation and the subsequent use of the clamp arrangement during a drying phase for the tree trunk. With a rectangular cross-section of the carrier section, the largest surfaces of the main body are oriented parallel to one another, so that after driving the clamp arrangement into the cut surface of the tree trunk, any reaction forces acting from the tree trunk on the largest surfaces of the carrier section do not lead to a resulting force which would drive the clamp arrangement back out of the tree trunk. If the carrier section is designed with a wedge-formed cross-section, on the one hand this facilitates demoulding from the plastic injection mould, on the other hand this also facilitates the driving operation into the cut surface of the tree trunk, since the volume of wood of the tree trunk which needs to be displaced can be displaced in a particularly advantageous manner through the wedge effect of the carrier section. A wedge angle of the cross-section of the carrier section which the largest surfaces of the carrier section assume in relation to one another preferably lies within a range from 0 degrees to 5 degrees. The extension of the blade section along the longest edge of the carrier section guarantees that at least substantially the same forces occur at all points along the entire carrier section during the course of the driving operation.

Preferably, retaining tongues attached at opposite ends of the main body in each case have a profile in the form of a section of a circular ring, in particular a coaxial profile. This profile makes possible a stabilization effect for the end-side retaining tongues, as a result of which a torsion on the end-side retaining tongues as well as a tilting of the end-side retaining tongues can be prevented. In addition, this measure minimizes a crack formation in the end face of the tree trunk which could be caused through the clamp arrangement being driven in.

In an advantageous further development of the invention, retaining tongues attached at opposite ends of the main body are in each case formed with a barb adjacent to their respective cutting edge. The function of the undercut is to guarantee a positive locking of the clamp arrangement in the tree trunk in order to prevent the clamp arrangement from being driven out of the tree trunk following completion of the driving operation.

The invention further relates to a setting tool for manipulating a clamp arrangement according to an aspect of the invention, with a striking plate, which is designed to allow temporary fixing of the clamp arrangement through form-locking engagement of the snap lugs on the outer circumference of the striking plate and which is connected with a grip handle, characterised in that the grip handle and the striking plate are designed such that a centre of gravity of the setting tool is arranged in the centre of the grip handle. Preferably, the setting tool is designed in the manner of a hammer, in particular a mechanic's hammer or forge hammer, and comprises a grip handle, which can in particular be made of wood or plastic, as well as a hammer head connected thereto, to which a preferably flat, in particular cylindrical striking plate is attached. A surface of the striking plate serving to transmit force to the clamp arrangement has a surface normal which is oriented at least virtually perpendicular to a longitudinal extension of the grip handle and thus, following attachment of a clamp arrangement and execution of a swinging movement by an operator, strikes the cut surface of the tree trunk into which the clamp arrangement is to be driven in an orientation which is as far as possible parallel to said cut surface in order to drive the clamp arrangement into the cut surface. In order to guarantee an advantageous operation of the setting tool, also where numerous striking actions are carried out, the hammer head with the striking plate attached thereto is arranged on the grip handle such that a centre of gravity of the setting tool substantially determined by the hammer head lies on a central axis or neutral fibre of the grip handle. In view of the fact that the hammer head is typically made of a metallic material and the grip handle is typically made of a wooden material or a plastic material it is to be assumed that the centre of gravity of the setting tool is arranged in a region of the grip handle which corresponds at most to a third of the overall length of the grip handle and is arranged adjacent to the hammer head.

It is advantageous if a joint arrangement, in particular a ball-joint, is formed between the grip handle and the striking plate. The joint arrangement, which makes possible a swivelable mounting of the striking plate relative to the grip handle, makes possible an advantageous adaptation of the orientation of the clamp arrangement on striking the cut surface of the tree trunk, since a compensating movement with respect to a possibly not optimal orientation of the grip handle in relation to the cut surface of the tree trunk can take place, at least within at least one degree of freedom of the swivelling movement determined through the joint arrangement, which can in particular be a ball-joint.

The problem addressed by the invention is solved through a setting tool system with a setting tool according to an aspect of the invention, with a clamp arrangement according to another aspect of the invention and with a clamp magazine which has a magazine shaft designed to hold several clamp arrangements in a stack arrangement as well as a spring-loading device designed to deliver a first clamp arrangement from the stack arrangement at a shaft opening. Stacking up several clamp arrangements into a stack arrangement within a magazine shaft of a clamp magazine makes possible a particularly compact storage of the clamp arrangements. The spring-loading device arranged in the magazine shaft guarantees that the first clamp arrangement in the stack arrangement is made available at a shaft opening of the magazine shaft of the clamp magazine and can be removed from the magazine shaft with the aid of the setting tool. During this removal operation, the setting tool is preferably brought into contact with the clamp arrangement in such a way that the snap lugs attached to the clamp arrangement engage in a form-locking manner with the striking plate of the setting tool, as a result of which the further manipulation of the clamp arrangement can take place in a simple manner. On removal of the first clamp arrangement from the magazine shaft, due to the spring action of the spring-loading device the next clamp arrangement is moved up to the shaft opening and retained there by means of suitable projections and now represents the first clamp arrangement in the stack arrangement. Preferably, the clamp magazine is designed such that it can accommodate at least 10, preferably 20, in particular 30 clamp arrangements.

The aforementioned problem is also addressed by a method of using a setting tool system according to an aspect of the invention. The setting tool system is used to secure a cut surface of a tree trunk and comprises the steps: picking up a clamp arrangement from the clamp magazine with the setting tool through form-locking engagement of the snap lugs of the clamp arrangement with the outer circumference of the striking plate, removing the clamp arrangement from the clamp magazine and driving the clamp arrangement into a cut surface of a tree trunk, in particular in such a way that retaining tongues attached to the main body at a distance from one another come to lie on either side of a crack in the cut surface of the tree trunk and that the main body spans the crack.

BRIEF DESCRIPTION OF THE DRAWINGS

An advantageous embodiment of the invention is illustrated in the drawing, wherein.

DETAILED DESCRIPTION

A clamp arrangement illustrated in FIGS. 1 to 5 is designed to be driven into a cut surface, not shown, of a tree trunk, also not shown, in order to prevent or at least minimize a propagation along the tree trunk of cracks which may be present in the cut surface. Preferably, the clamp arrangement is manufactured in a single piece, in particular as an injection-moulded plastic part, in order on the one hand to guarantee an advantageous flow of forces within the clamp arrangement and on the other hand to ensure economical manufacture. Furthermore, the clamp arrangement is manipulated with the aid of a setting tool, not shown in detail, which can in particular be a special form of hammer in order that, here too, an economical and practical solution can be offered.

High-strength, in particular reinforced—also fibre-reinforced—plastics can preferably be considered for use as a starting material for the clamp arrangement. On the one hand, such plastics make possible a slim design of the clamp arrangement 1 and on the other hand do not cause damage to the tools during further processing of the tree trunks.

The clamp arrangement 1 comprises, purely by way of example, a main body 2, which is slat-like in form and, purely by way of example, a carrier section 4, of prismatic design and with rectangular cross-section, extending along an extension axis 3 as well as a blade section 5 adjoining the carrier section 4 on its end face. Retaining tongues 6, 7 oriented transversely to the extension axis 3 are arranged on the main body 2 at each end, in each case forming an at least substantially T-formed profile 30 with a directly adjacent section of the main body 2 which is not identified more specifically. By way of example, the two retaining tongues 6, 7 are in each case designed in the form of circular ring sections which have central axes oriented parallel to one another, which are not however shown in the Figures. Wedge-formed end regions 8 are in each case formed on circumferential end faces of the retaining tongues 6, 7, wherein outer edges 9 of the end regions 8 are in each case oriented parallel to one another. The retaining tongues 6, 7 are, in the same manner as the main body 2, provided with blade sections 10 which are formed in the same manner as the blade section 5 and will not be described in greater detail in the following. Outwardly projecting, L-formed profiled snap lugs 12 are in each case provided on the retaining tongues 6 and 7 adjacent to a—purely by way of example—flat narrow side or end face 11 opposite the blade section 10, wherein the snap lugs 12 comprise inwardly projecting, wedge-formed profiled snap-locking geometries 15. By way of example, a first, in particular shorter, L-arm 16 of the snap lug 12 is oriented parallel to the end face 11 of the respective retaining tongue 6 or 7, whereas a second, in particular longer L-arm 17 is oriented at least substantially perpendicular to the end face 11 of the respective snap lug 6, 7 and carries the inwardly projecting snap-locking geometry 15.

The main function of the retaining tongues 6, 7 at the ends and of the main body 2 is to guarantee a local stabilization of the cut surface after the clamp arrangement 1 has been driven into a cut surface of a tree trunk, not shown. In particular, their purpose is to absorb forces occurring during a drying process of the tree trunk, which can be caused through internal stresses within the tree trunk, counteracting a propagation of cracks starting out from the cut surface of the tree trunk into the interior of the tree trunk. Fundamentally, it is to be assumed that, during the drying-out of the tree trunk, tensile forces in particular occur as a result of material shrinkage which are transferred from the tree trunk into the retaining tongues 6, 7 and lead to tensile stresses in the main body 2.

In order to support an advantageous driving of the clamp arrangement into the tree trunk, not represented in detail, in the embodiment illustrated in FIGS. 1 to 5 two additional retaining tongues 18, 19 are provided which in each case, purely by way of example, have their largest extension oriented transversely to the extension axis 3 of the main body 2 and as a result in each case form a cross-formed profile 31 with adjacent regions of the main body. The function of the retaining tongues 18, 19 is to support the slat-formed main body 2 during the driving operation into the cut surface of the tree trunk and thus prevent a torsion of the main body 2. In the extreme case, such torsion would lead to an orientation of the blade-formed main body 2 no longer coinciding with the orientation of the also blade-formed retaining tongues 6, 7. As a result, these would no longer be oriented in a common cutting direction symbolised by the arrow 20 in FIG. 1 and the case could arise in which the clamp arrangement might possibly be driven obliquely into the cut surface of the tree trunk or so badly damaged during the driving operation that it cannot actually be driven completely into the cut surface of the tree trunk. Purely by way of example, the retaining tongues 18, 19, like the retaining tongues 6, 7, are in each case provided on their end faces with wedge-formed end regions 21 and also in each case have on a first narrow side 22 a blade section 23 which is preferably formed exactly like the blade sections 10 and 5.

Together with the narrow side of the retaining tongues 6, 7, also referred to as the end face 11, as well as a narrow side 25 of the main body 2, a second narrow side 24 opposite the first narrow side 22 forms a striking surface which is designed for the transmission of pressure forces onto the clamp arrangement 1. If the blade sections 5, 10 as well as 23 are placed against a cut surface of a tree trunk, not shown, the clamp arrangement 1 can be driven into the tree trunk with the aid of pressure forces acting on the narrow sides 11, 24, 25.

Figure 1:
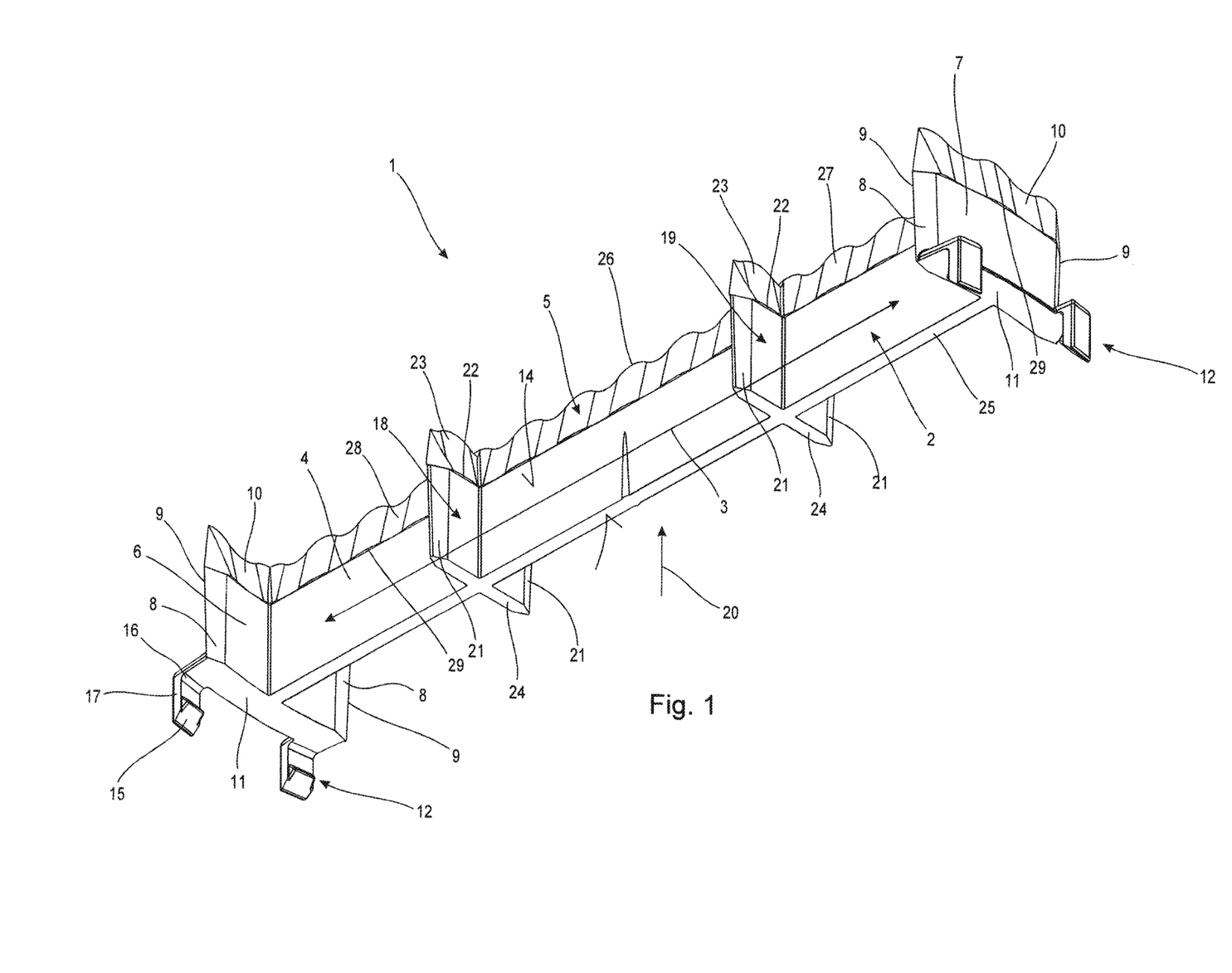
FIG. 1 shows a perspective top view of a clamp arrangement.
Figure 2:
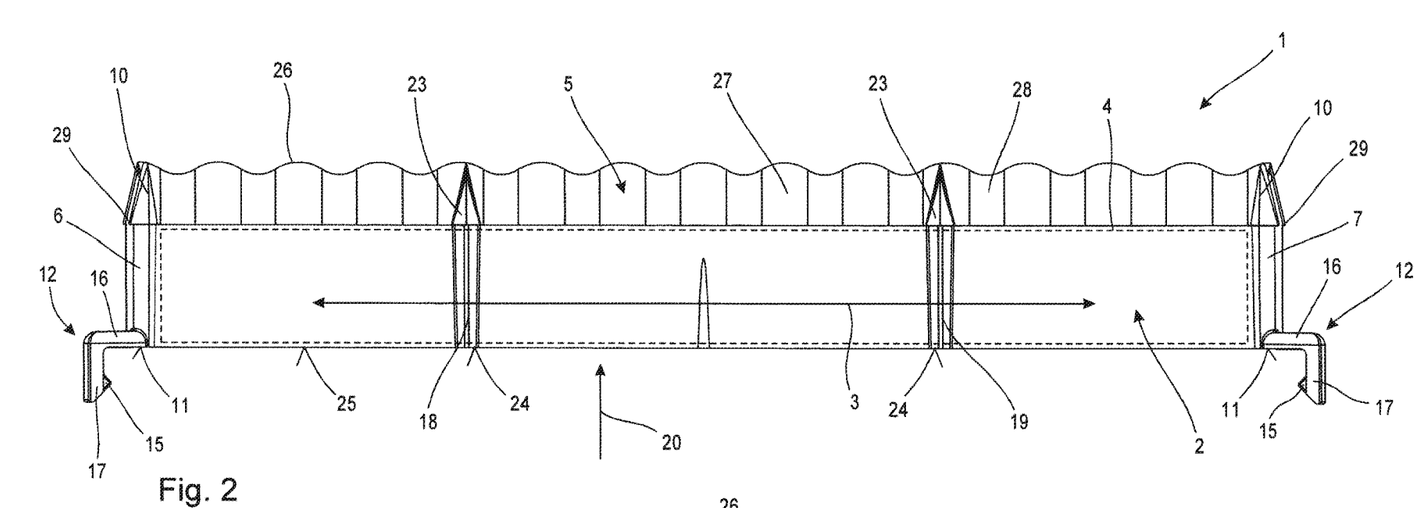
FIG. 2 shows a front view of the clamp arrangement as shown in FIG. 1.
Figure 3:
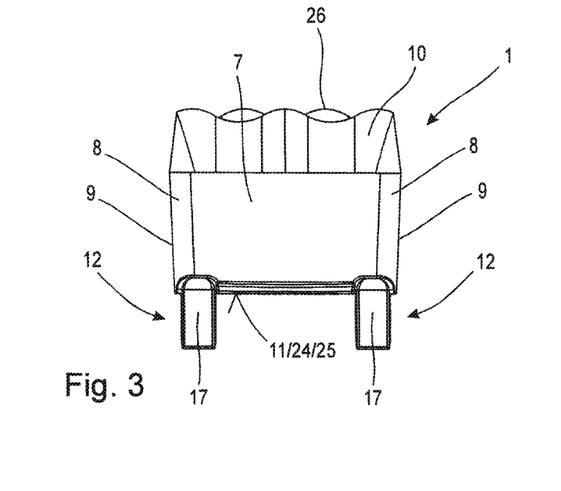
FIG. 3 shows a side view of the clamp arrangement as shown in FIGS. 1 and 2.
Figure 4:
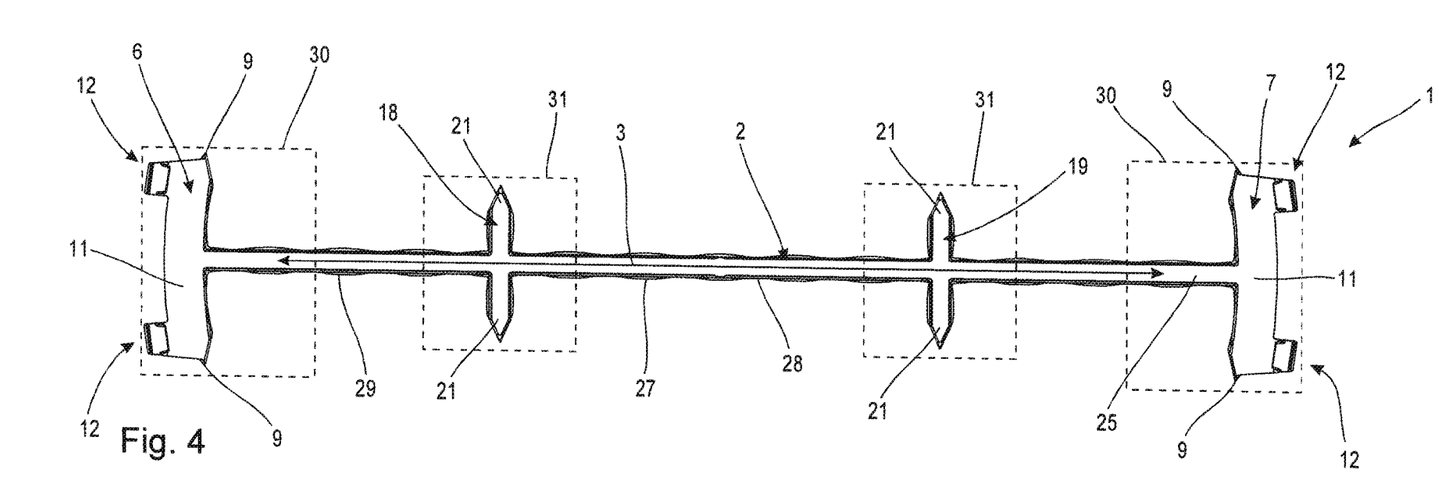
FIG. 4 shows a view from above of the clamp arrangement as shown in FIGS. 1 to 3.
Figure 5:
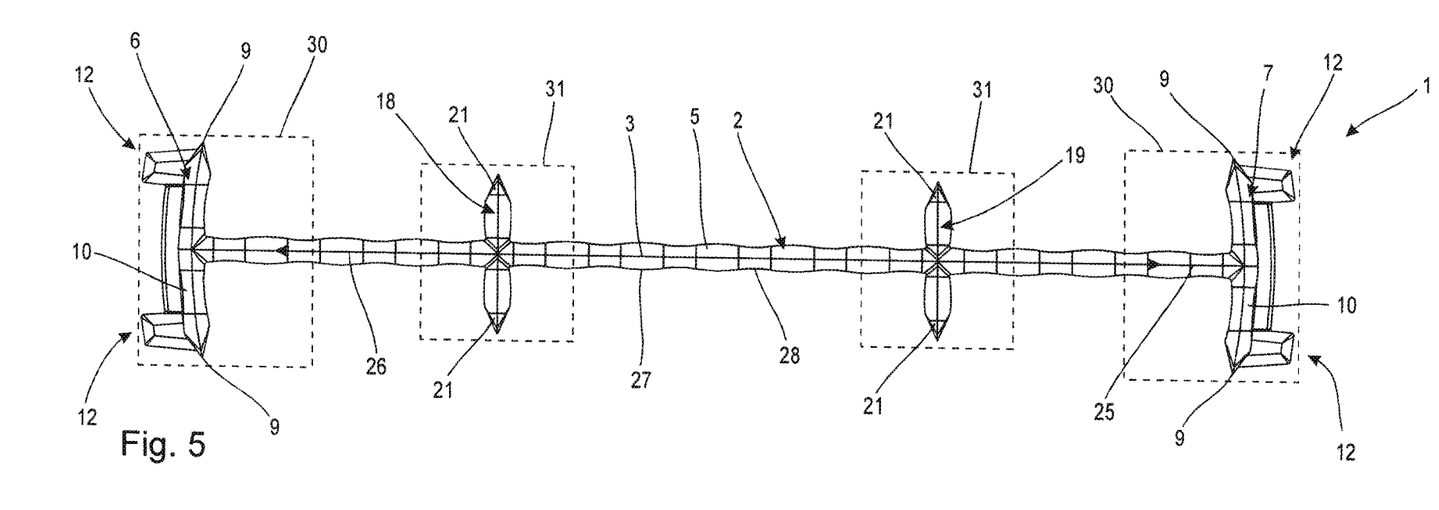
FIG. 5 shows a view from below of the clamp arrangement as shown in FIGS. 1 to 4.

As can be seen from FIGS. 1 to 3 as well as 5, the blade sections 5, 10, 23 are, purely by way of example, in two respects wave-formed in design. On the one hand, a sharply tapering cutting edge 26 is wave-formed in design, as can be seen in particular from the front view as shown in FIG. 2 as well as the side view as shown in FIG. 3. The blade sections 5, 10, 23 are also wave-formed in profile in cross-sectional planes which are oriented parallel to the narrow side 25 of the main body, as can be seen in particular from the view from below as shown in FIG. 5. By way of example, the blade sections 5, 10, 23 have a width extending transverse to the cutting direction, wherein the width increases and decreases, as shown in particular in FIGS. 4 and 5. As a result, the blade sections 5, 10, 23 are in each case designed as a sequence of convex and concave surface sections 27, 28, wherein the convex surface sections 27 project at least slightly at the transition to the carrier section 4, as can be seen in particular from the perspective representation in FIG. 1. As a result, small barbs 29, so to speak, are formed which are intended to prevent the clamp arrangement 1 from slipping out of the tree trunk in an undesirable manner following the driving operation. In the same way, this also applies to the blade sections 10 which are formed on the retaining tongues 6, 7.

In order to realize an advantageous method of manufacturing the clamp arrangement by means of a plastic injection-moulding process, both the carrier section 4 and also the retaining tongues 18, 19 are provided with a demoulding draft angle, so that both the retaining tongues 18, 19 and also the carrier section 4 narrow slightly in the direction of the narrow sides 24, 25. Furthermore, this slight wedge geometry, which can be clearly seen in FIG. 2, in particular for the retaining tongues 18, 19, also leads to a particularly reliable anchoring of the clamp arrangement 1 in the wood of the tree trunk. Furthermore, purely by way of example, the blade sections 23 of the retaining tongues 18, 19 also form barbs 29 with their convex surface sections 27.

Figure 6:
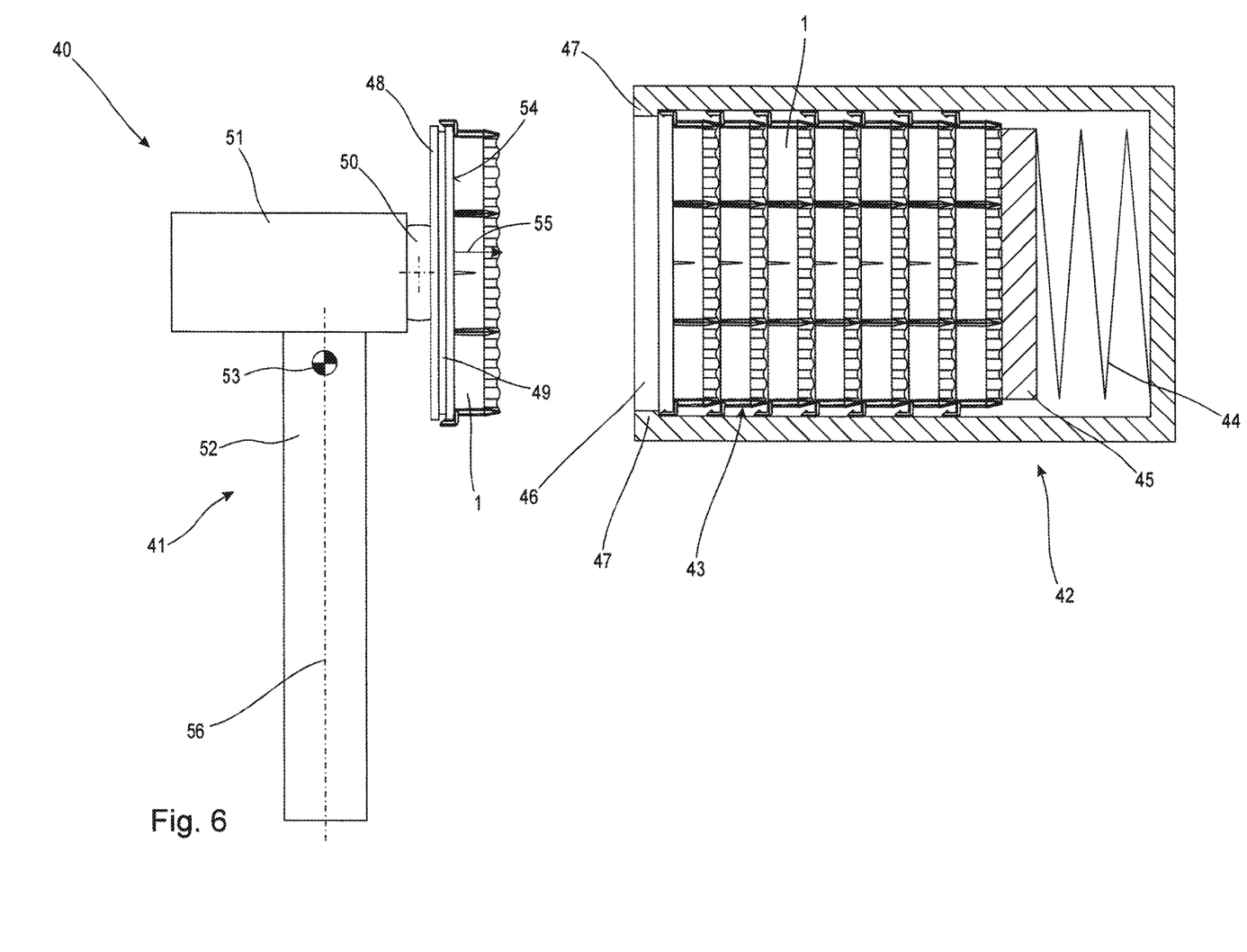
FIG. 6 shows a schematic representation of a setting tool system.

A setting tool system 40, represented schematically in FIG. 6, comprises a hammer-like setting tool 41, a clamp magazine 42 as well as several clamp arrangements 1.

The clamp magazine 42 has a magazine shaft 43 designed to hold several clamp arrangements 1 in a stack arrangement as well as a spring-loading device 44 with associated pressure plate 45 designed to deliver a first clamp arrangement from the stack arrangement at a recess 46 of the clamp magazine 42, also referred to as a shaft opening. Stacking up several clamp arrangements 1 into a stack arrangement within the magazine shaft 43 of the clamp magazine 42 makes possible a particularly compact storage of the clamp arrangements 1. The first clamp arrangement 1 in the stack arrangement is pressed up against projections 47 on the recess 46 of the clamp magazine 42 by the spring-loading device 44 arranged in the magazine shaft 43 and can be removed from the magazine shaft 43 with the aid of the setting tool 41. During this removal operation, the setting tool 41 is preferably pushed into the recess 46 from the side and thus brought into contact with the clamp arrangement 1 in such a way that the snap lugs 12 on the clamp arrangement 1 engage in a form-locking manner with a, by way of example, cylindrical striking plate 48 of the setting tool 41.

On removal of the first clamp arrangement 1 from the magazine shaft 43, due to the spring action of the spring-loading device 44 the next clamp arrangement 1 is pressed against the projections 47 and now represents the first clamp arrangement 1.

In addition to the striking plate 48 which, in order to temporarily hold in place the clamp arrangement 1 through form-locking engagement of the snap lugs 12, has a circular, by way of example groove-formed peripheral undercut 49, the setting tool 41 comprises a ball-joint 50, a hammer head 51 as well as a grip handle 52. The ball-joint 50 arranged between the striking plate 48 and the hammer head 51 makes possible a swivelling movement of the striking plate 48 relative to the hammer head 51 and thus makes possible an advantageous orientation of the striking plate 48 with the clamp arrangement 1 attached thereto in relation to a cut surface of a tree trunk, not shown.

The grip handle 52, the hammer head 51 and the striking plate 48 are designed such that a centre of gravity 53 of the setting tool 41 lies in the centre of the grip handle 52.

A surface 54 of the striking plate 48 serving to transmit force to the clamp arrangement 1 has a surface normal 55 which is oriented at least virtually perpendicular to a longitudinal extension 56 of the grip handle 52 and thus following attachment of a clamp arrangement 1 and execution of a swinging movement by an operator, strikes the cut surface, not shown, of the tree trunk into which the clamp arrangement 1 is to be driven in an orientation which is as far as possible parallel to said cut surface in order to drive the clamp arrangement 1 into the cut surface.

What is claimed is:

1. A clamp arrangement for tree trunks, with a main body on which at least three retaining tongues are formed, arranged at a distance from one another, wherein the main body and the retaining tongues are oriented, as blades, in a common cutting direction, and wherein at least two snap lugs are formed on at least one retaining tongue to allow a detachable connection with a setting tool, and wherein the main body and the retaining tongues have a prismatic carrier section and a blade section adjoining the carrier section, and wherein the blade section has a wave-formed cutting edge and a wave-formed profile in cross-sectional planes oriented perpendicular to the cutting direction, and wherein the wave-formed cutting edge is formed such that, at the beginning of a driving operation, the blade section initially only lies against a cut surface of the tree trunk at certain points, where it already begins to cut into the cut surface, while adjacent regions of the blade section only come into contact with the cut surface of the tree trunk once a certain penetration of the clamp arrangement has begun, and wherein the wave-formed profile is formed as a sequence of convex and concave surface sections, and wherein the convex surface sections project beyond the prismatic carrier section to form barbs for preventing the clamp arrangement from slipping out of the tree trunk after the driving operation.

2. The clamp arrangement according to claim 1, wherein the retaining tongues project from a largest surface of the main body.

3. The clamp arrangement according to claim 1, wherein the carrier section of the main body and/or the retaining tongue has a narrow side opposite the blade section which is designed for a transmission of cutting forces into the main body and/or the retaining tongue.

4. The clamp arrangement according to claim 1, wherein the snap lug has an L-formed profile, wherein a first L-arm is oriented parallel to the retaining tongue and wherein a second L-arm is provided with a projecting, snap-locking geometry.

5. The clamp arrangement according to claim 4, wherein the second L-arm has a wedge-formed profile.

6. The clamp arrangement according to claim 1, wherein at least one of said retaining tongues attached at the end of the main body forms an at least substantially T-formed profile with the main body and/or wherein the retaining tongue attached to the main body between further retaining tongues forms a T-formed or cross-formed profile.

7. The clamp arrangement according to claim 1, wherein the snap lugs are formed on the retaining tongues attached at opposite ends of the main body, arranged at a maximum distance from one another.

8. The clamp arrangement according to claim 7, wherein the snap lugs are formed in pairs on the retaining tongues.

9. The clamp arrangement according to claim 1, wherein the carrier section is designed, at least in sections, with a rectangular or wedge-formed cross-section and that the blade section extends along a longest edge of the carrier section.

10. The clamp arrangement according to claim 1, wherein the retaining tongues attached at opposite ends of the main body in each case have a profile in the form of a section of a circular ring.

11. The clamp arrangement according to claim 10, wherein the retaining tongues attached at opposite ends of the main body are oriented coaxially to each other.

12. The clamp arrangement according to claim 1, wherein the blade section has a height extending from the carrier section to the wave-formed cutting edge in the cutting direction, the height varying to form a sequence of convex and concave sections defining the wave-formed cutting edge.

13. The clamp arrangement according to claim 1, wherein the blade section has a width extending transverse to the cutting direction, the width increasing and decreasing to form the sequence of convex and concave sections on opposite sides of the blade section defining the wave-formed profile.

* * * * *